(12) United States Patent
Park et al.

(10) Patent No.: US 12,343,978 B2
(45) Date of Patent: Jul. 1, 2025

(54) DISPLAY MODULE AND ELECTRONIC DEVICE INCLUDING THE SAME

(71) Applicant: SAMSUNG DISPLAY CO., LTD., Yongin-si (KR)

(72) Inventors: Dongjin Park, Seongnam-si (KR); Dongwoo Seo, Suwon-si (KR); Jaiku Shin, Hwaseong-si (KR); Sung Chul Choi, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 1015 days.

(21) Appl. No.: 17/240,070

(22) Filed: Apr. 26, 2021

(65) Prior Publication Data
US 2022/0015253 A1 Jan. 13, 2022

(30) Foreign Application Priority Data
Jul. 10, 2020 (KR) ........................ 10-2020-0085287

(51) Int. Cl.
*B32B 7/12* (2006.01)
*B32B 3/02* (2006.01)
*B32B 7/05* (2019.01)

(52) U.S. Cl.
CPC .................. *B32B 7/12* (2013.01); *B32B 3/02* (2013.01); *B32B 7/05* (2019.01); *B32B 2307/4023* (2013.01); *B32B 2457/20* (2013.01)

(58) Field of Classification Search
CPC .... B32B 3/02; B32B 7/05; B32B 7/12; B32B 2307/4023; B32B 2457/20; G02B 1/11; G02B 1/14; G02B 1/18; G06F 1/1637; G06F 1/1641; G06F 1/1652; G06F 2203/04102; G09F 9/00; G09F 9/301; G09F 9/33; H04M 1/0214; H04M 1/0268; H04M 1/185
See application file for complete search history.

(56) References Cited

U.S. PATENT DOCUMENTS

| | | | |
|---|---|---|---|
| 10,777,101 | B2 | 9/2020 | Park |
| 2019/0334114 | A1 | 10/2019 | Park |
| 2020/0016868 | A1 | 1/2020 | Woody et al. |

FOREIGN PATENT DOCUMENTS

| | | | | |
|---|---|---|---|---|
| EP | 3346514 A1 | * | 7/2018 | ........... H01L 27/323 |
| KR | 10-2017-0085420 | | 7/2017 | |
| KR | 10-2019-0052475 | | 5/2019 | |
| KR | 10-2019-0058491 | | 5/2019 | |

(Continued)

*Primary Examiner* — Gerard Higgins
*Assistant Examiner* — Sathavaram I Reddy
(74) *Attorney, Agent, or Firm* — F. CHAU & ASSOCIATES, LLC

(57) ABSTRACT

An electronic device includes an upper member, a first adhesive layer, and a second adhesive layer. The upper member includes a window having a rear surface opposite to a front surface, a protective layer on the front surface of the window, and an impact absorbing layer on the rear surface of the window. The display panel is below the upper member, and the first adhesive layer is between the window and the protective layer. The second adhesive layer is between the window and the impact absorbing layer. An edge of the front surface of the window is exposed by the first adhesive layer, and an edge of the second adhesive layer is exposed by the window.

20 Claims, 12 Drawing Sheets

(56) References Cited

FOREIGN PATENT DOCUMENTS

| KR | 10-2019-0124844 | | 11/2019 |
|---|---|---|---|
| KR | 10-2019-0128025 | | 11/2019 |
| WO | WO-2020123758 A1 | * | 6/2020 |

* cited by examiner

DISPLAY MODULE AND ELECTRONIC DEVICE INCLUDING THE SAME

CROSS-REFERENCE TO RELATED APPLICATIONS

This U.S. non-provisional patent application claims priority under 35 U.S.C. § 119 of Korean Patent Application No. 10-2020-0085287, filed on Jul. 10, 2020, the entire contents of which are hereby incorporated by reference.

BACKGROUND

1. Field

One or more embodiments described herein relate to a foldable electronic device.

2. Description of Related Art

Electronic devices include active areas which are activated in response to electrical signals. Such an electronic device may sense an input applied from an external source through the active area and may display various images to provide information to a user. Electronic devices are being developed to have various shapes which include the active areas.

SUMMARY

One or more embodiments described herein provide an electronic device which may have improved stability and durability, and in at least one case reduces or prevents interference between adhesive layers that include an intervening window.

In accordance with one embodiment of the inventive concept, an electronic device includes an upper member, a display panel, a first adhesive layer, and a second adhesive layer. The upper member includes a window having a front surface and a rear surface opposite to the front surface, a protective layer disposed on the front surface of the window, and an impact absorbing layer disposed on the rear surface of the window. The display panel is disposed below the upper member. The first adhesive layer is disposed between the window and the protective layer. The second adhesive layer is disposed between the window and the impact absorbing layer. An edge of the front surface of the window is exposed by the first adhesive layer, and an edge of the second adhesive layer is exposed by the window.

In accordance with one embodiment, a display module includes an upper member, a releasing film, a display panel, a first adhesive layer, and a second adhesive layer. The upper member includes a window having a front surface and a rear surface opposite to the front surface, a protective layer disposed on the front surface of the window, and an impact absorbing layer disposed on the rear surface of the window. The releasing film is configured to cover the upper member. The display panel is disposed below the upper member. The first adhesive layer is disposed between the window and the protective layer. The second adhesive layer is disposed between the window and the impact absorbing layer. An edge of the front surface of the window is exposed by the first adhesive layer, and an edge of the second adhesive is exposed by the window.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1A:
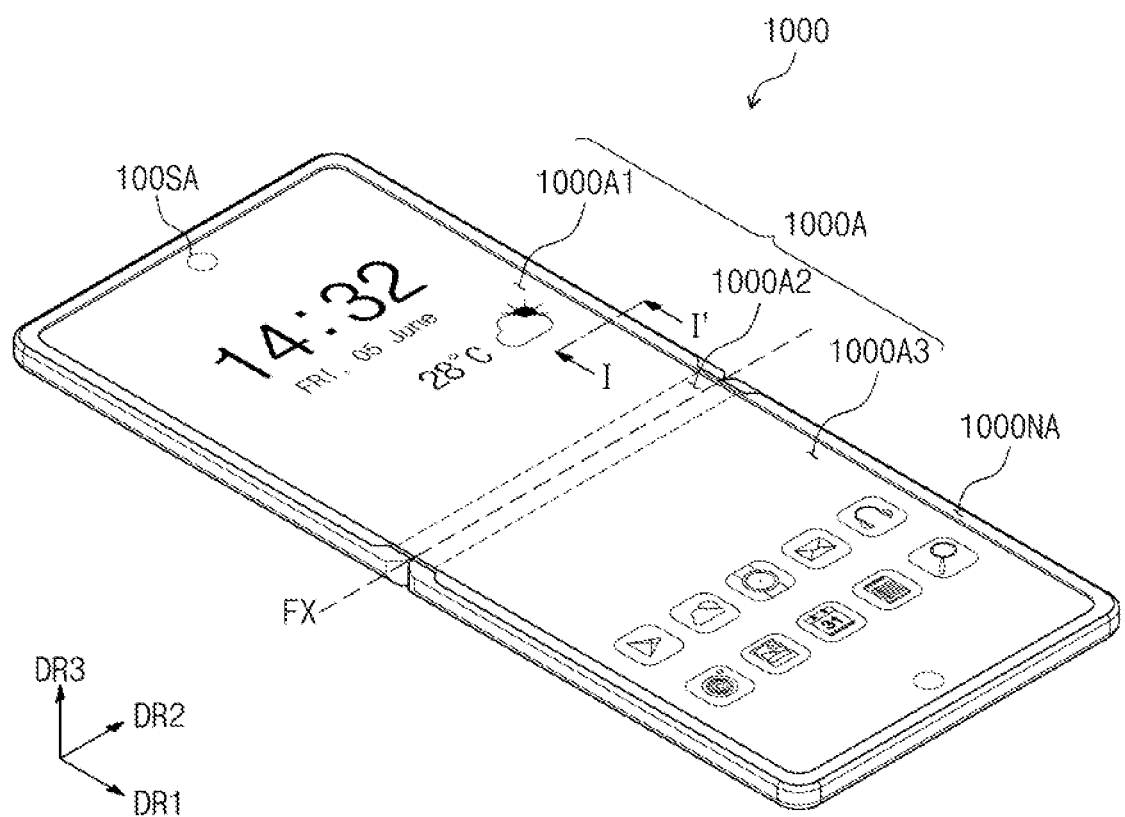
FIG. 1A illustrates an embodiment of an electronic device in an unfolded state.

In this specification, it will be understood that when an element (or a region, a layer, a portion, or the like) is referred to as "being on", "connected to", or "coupled to" another element, it can be directly disposed on/connected to/coupled to the other element, or one or more intervening elements may be disposed therebetween. Like numbers refer to like elements throughout. Also, in the drawings, the thicknesses, ratios, and dimensions of the elements are exaggerated for effective description of the technical contents. The term "and/or" includes any and all combinations of one or more of the associated listed items.

It will be understood that, although the terms first, second, etc. may be used herein to describe various elements, these elements should not be limited by these terms. These terms are only used to distinguish one element from another element. For example, a first element may be referred to as a second element, and similarly, a second element may be referred to as a first element without departing from the scope of the present disclosure. The singular forms include the plural forms unless the context clearly indicates otherwise. Also, terms such as "below", "lower", "above", and "upper" may be used to describe the relationships of the components illustrated in the drawings. These terms have a relative concept, and are described on the basis of the directions indicated in the drawings.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that the term "includes" or "comprises", when used in this specification, specify the presence of stated features, integers, steps, operations, elements, components, or a combination thereof, but do not preclude the presence or addition of one or more other features, integers, steps, operations, elements, components, or combinations thereof. Hereinafter, embodiments of the present invention will be described with reference to the accompanying drawings.

Figure 1B:
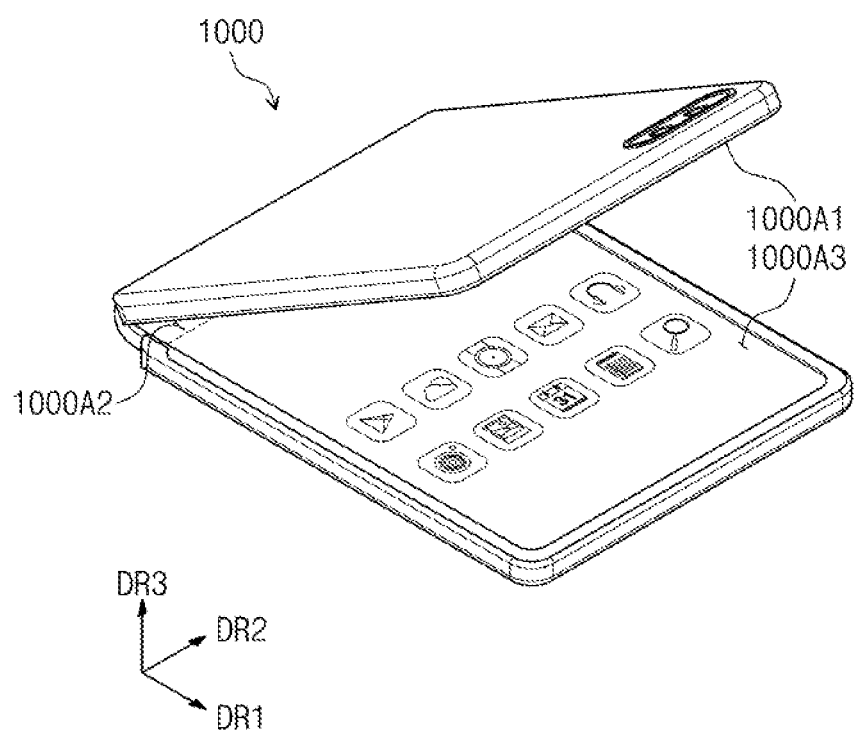
FIG. 1B illustrates an embodiment of the electronic device in a folded state.
Figure 2:
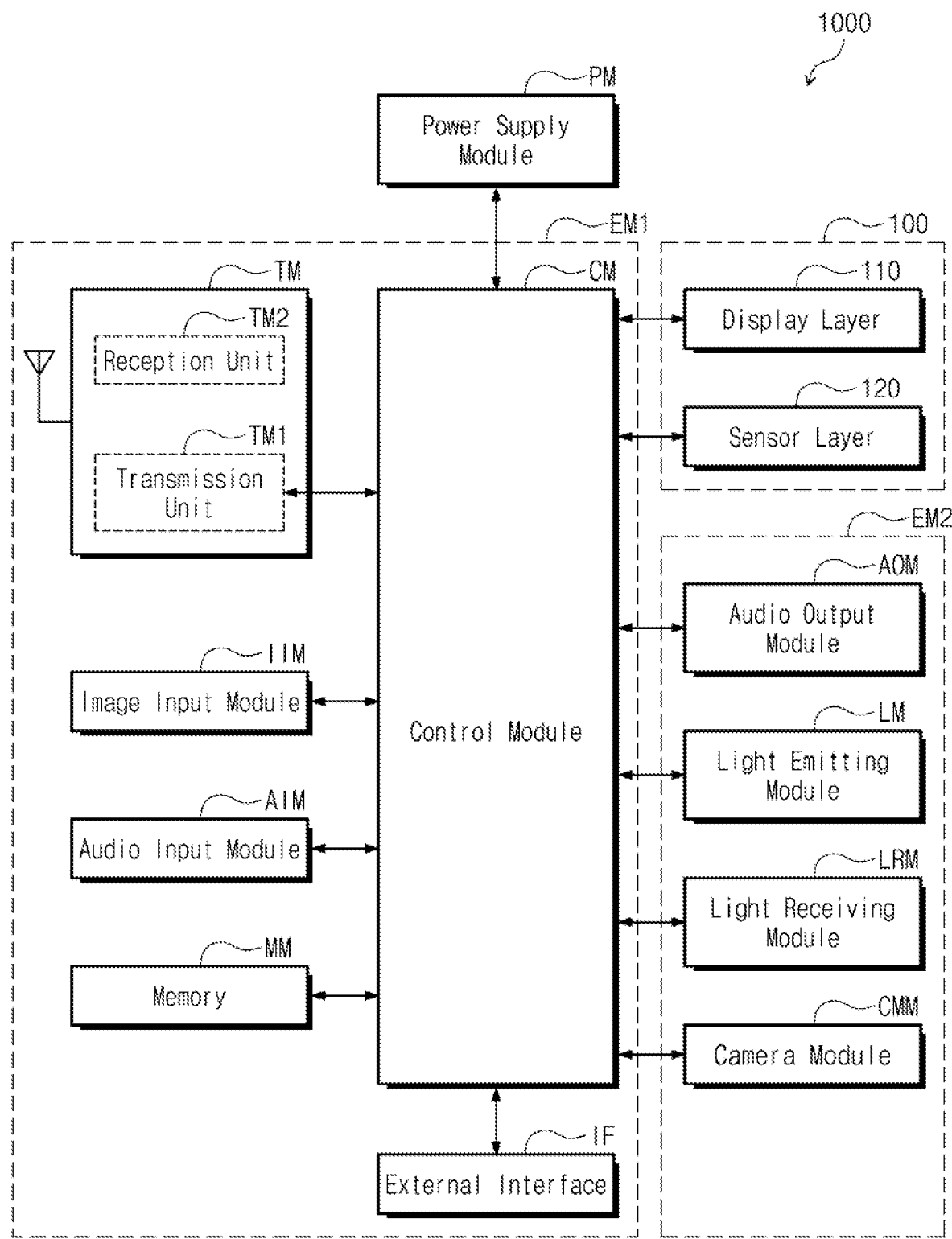
FIG. 2 illustrates an embodiment of an internal configuration of the electronic device.

FIG. 1A is a perspective view of an electronic device 1000 according to an embodiment of the inventive concept. FIG. 1B is a perspective view of an electronic device according to an embodiment of the inventive concept. FIG. 2 is a block diagram of an internal configuration of the electronic device according to an embodiment of the inventive concept.

Referring to FIGS. 1A and 1B, the electronic device 1000 may be activated in response to an electrical signal. Examples of the electronic device 1000 include, but are not limited to, a mobile phone, a tablet PC, a vehicle navigation unit, a game console, or a wearable device, but is not limited thereto. In FIG. 1A, the electronic device 1000 is illustratively shown as a mobile phone.

The electronic device 1000 may display an image through an active area 1000A. When the electronic device 1000 is in an unfolded state, the active area 1000A may include a plane defined by a first direction DR1 and a second direction DR2. A thickness direction of electronic device 1000 may be parallel to a third direction DR3, that crosses the first direction DR1 and the second direction DR2. Thus, a front surface (or a top surface) and a rear surface (or a bottom surface) of the electronic device 1000 may be defined by the third direction DR3.

The active area 1000A may include a first area 1000A1, a second area 1000A2, and a third area 1000A3. The second area 1000A2 may be folded about a folding axis FX extending in the second direction DR2. Thus, the first area 1000A1 and the third area 1000A3 may be non-folding areas, and the second area 1000A2 may be a folding area.

When the electronic device 1000 is folded, the first area 1000A1 and the third area 1000A3 may face each other. When completely folded, the active area 1000A may not be externally exposed or visible. Accordingly, this state may be referred to as in-folding. However, this is merely an example, and operation of the electronic device 1000 is not limited thereto. For example, in an embodiment of the inventive concept, when the electronic device 1000 is folded, the first area 1000A1 and the third area 1000A3 may be opposite to each other. Thus, the active area 1000A may be exposed to or externally visible. Accordingly, this state may be referred to as out-folding. In one embodiment, the electronic device may be in a partially folding state (e.g., which may be considered a folding state or out-folding state) where at least one of the first area 1000A1 and the third area 1000A3 are at least partially externally visible.

The electronic device 1000 may be operated one of the in-folding state or the out-folding state. In one embodiment, the electronic device 1000 may be operated in both the in-folding and out-folding states. In this case, the same area of the electronic device 1000 (e.g., second area 1000A2) may be in-folded and out-folded. Also, a portion of the electronic device 1000 may be in-folded, and another portion thereof may be out-folded.

FIGS. 1A and 1B illustratively show an embodiment of the electronic device including one folding area and two non-folding areas, but the numbers of folding areas and/or non-folding areas may be different in another embodiment. For example, in one embodiment, electronic device 1000 may include two or more of each, e.g., a plurality of non-folding areas and a plurality of folding areas disposed between neighboring ones of the non-folding areas.

Additionally, FIGS. 1A and 1B illustratively show that the folding axis FX is parallel to short sides of the electronic device 1000, but the location of the folding axis FX may be in a different location in another embodiments. For example, the folding axis FX may extend in a direction corresponding to long sides of the electronic device 1000, for example, in a direction parallel to the first direction DR1. In this case, the first area 1000A1, the second area 1000A2, and the third area 1000A3 may be arranged in this order in the second direction DR2.

The electronic device 1000 may also include a sensing area 100SA, and at least one module that requires light may be disposed below the sensing area 100SA. The sensing area 100SA may overlap a camera module or a proximity illumination sensor, but the embodiment of the inventive concept is not limited thereto. The sensing area 100SA may be completely surrounded by the active area 1000A, or at least a portion of the sensing area 100SA may be surrounded, in other embodiments. However, the embodiment of the inventive concept is not limited to one case.

Referring to FIG. 2, according to an embodiment of the inventive concept, the electronic device 1000 may include a display panel 100, a power supply module PM, a first electronic module EM1, and a second electronic module EM2. The display panel 100, the power supply module PM, the first electronic module EM1, and the second electronic module EM2 may be electrically connected to each other.

The display panel 100 may include a display layer 110 and a sensor layer 120. The display layer 110 may be a substantive component that generates an image which may be externally visible to a user through the active area 1000A.

The first electronic module EM1 and the second electronic module EM2 may include various functional modules for operating the electronic device 1000. The first electronic module EM1 may be directly mounted on a mother board electrically connected to the display panel 100, or may be mounted on a separate substrate and electrically connected to a mother board through a connector or the like. The first electronic module EM1 may include a control module CM, a wireless communication module TM, an image input module IIM, an audio input module AIM, a memory MM, and an external interface IF. Without being mounted on a mother board, some of the modules may be electrically connected to the mother board through a flexible circuit board.

The control module CM controls overall operations of the electronic device 1000. In one embodiment, the control module CM may be a microprocessor. For example, the control module CM may activate and/or deactivate the display panel 100. In one embodiment, the control module CM may control other modules (e.g., the image input module IIM or the audio input module AIM) on the basis of a touch signal received from the display panel 100.

The wireless communication module TM may receive and/or transmit wireless signals from and/or to another terminal via Bluetooth or a Wi-Fi connection. The wireless communication module TM may receive and transmit voice signals using a general communication line. The wireless communication module TM includes a transmission unit TM1 for modulating and transmitting signals and a reception unit TM2 for demodulating the received signals.

The image input module IIM processes an image signal and converts the image signal to image data, which may be displayed through the display panel 100. The audio input module AIM uses a microphone to receive an external audio signal in a recording mode, a voice recognition mode, or the like and converts the received audio signal to electrical voice data.

The external interface IF may be connected to an external charger, wired/wireless data ports, a card socket (for example, a memory card, a SIM/UIM card), and/or the like.

The second module EM2 may include an audio output module AOM, a light emitting module LM, a light receiving module LRM, a camera module CMM, and the like. The components mentioned above may be directly mounted on a mother board, mounted on a separate substrate and electrically connected to the display panel 100 through a connector or the like, or electrically connected to the first electronic module EM1. The audio output module AOM converts audio data received from the wireless communication module TM or audio data stored in the memory MM and then outputs the converted audio data to an intended destination.

The light emitting module LM generates and outputs light, which, for example, may be infrared light or another type of light. In one embodiment, the light emitting module LM may include an LED element. For example, the light receiving module LRM may sense infrared light and may be activated when the infrared light determined to have a predetermined level or higher. In one embodiment, the light receiving module LRM may include a CMOS sensor. The infrared light generated in the light emitting module LM may be output and then reflected from an external object (for example, the finger or face of a user). The reflected infrared light may be incident on the light receiving module LRM. The camera module CMM captures an external image.

According to an embodiment of the inventive concept, at least a portion of an electronic module may be disposed below the display panel 100 and overlap the sensing area 100SA. The electronic module may include at least one of the components of the first electronic module EM1 and the second electronic module EM2. For example, the electronic module may include at least one of a camera, a speaker, a light detection sensor, or a heat detection sensor. The electronic module may sense an external object received through the sensing area 100SA and provide a sound signal (e.g., voice) to the outside through the sensing area 100SA. Also, the electronic module may include a plurality of components and is not limited to one embodiment.

According to an embodiment of the inventive concept, the electronic device 1000 may further include a transparent member disposed between the electronic module and the display panel 100. The transparent member may be an optically transparent film, so that an external input transmitted through the sensing area 100SA passes through the transparent member and then is transmitted to the electronic module. The transparent member may be attached to a rear surface of the display panel 100 or disposed between the display panel 100 and the electronic module without a separate adhesive layer. According to an embodiment of the inventive concept, the electronic device 1000 may have various structures and is not limited to one embodiment.

According to an embodiment of the inventive concept, the electronic module may be assembled to overlap the sensing area 100SA in the active area 1000A, when taken in a plan view. Accordingly, an increase in the peripheral area 1000NA due to accommodation of the electronic module may be prevented, and thus the appearance of the electronic device 1000 may be improved.

Figure 3A:
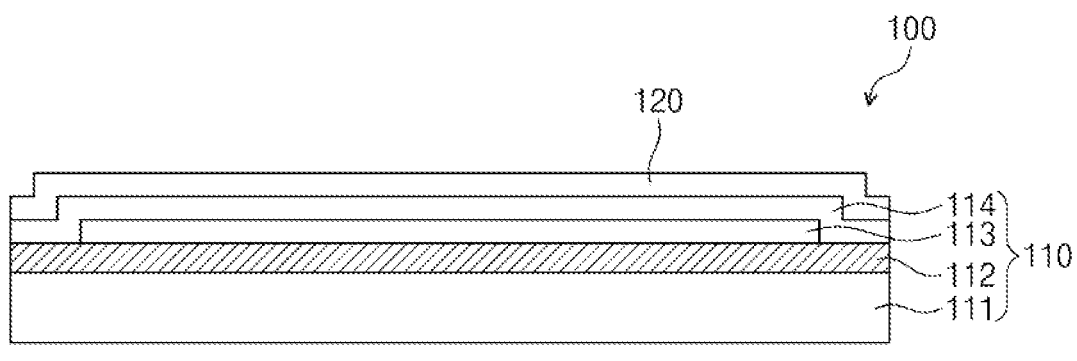
FIGS. 3A and 3B illustrate cross-sectional views of the electronic device.
Figure 3A:
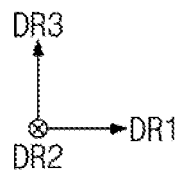
Figure 3B:
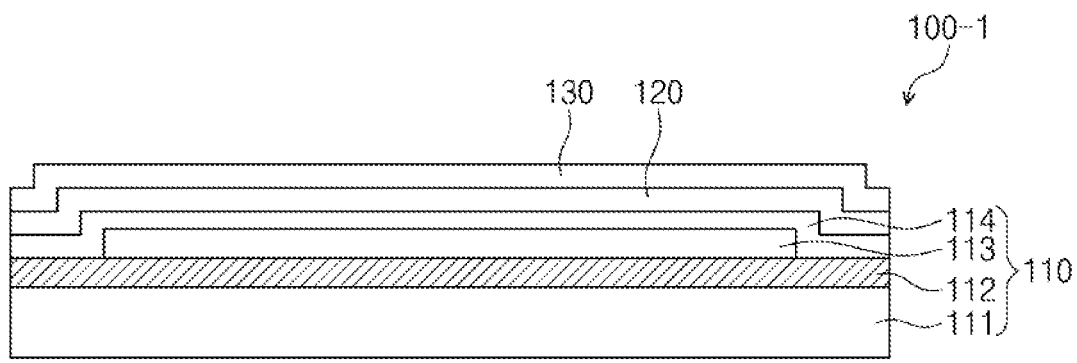
Figure 3B:
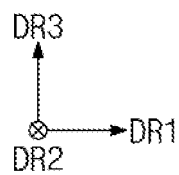

FIG. 3A is a cross-sectional view of an electronic device according to an embodiment of the inventive concept. FIG. 3B is a cross-sectional view of an electronic device according to another embodiment of the inventive concept.

Referring to FIG. 3A, a display panel 100 may be a component that generates an image and senses an input applied from a source, e.g., an external source. The display panel 100 may include a display layer 110 and a sensor layer 120. The display layer 110 may be a substantive component that generates an image and may include, for example, a light emitting display layer. In one embodiment, the display layer 110 may include an organic light emitting display layer, a quantum dot display layer, or a micro LED display layer.

The display layer 110 may include a base layer 111, a circuit layer 112, a light emitting element layer 113, and an encapsulation layer 114. The base layer 111 may include a synthetic resin film. The synthetic resin layer may include thermosetting resin. The base layer 111 may have a multi-layer structure. For example, the base layer 111 may have a three layer structure of a synthetic resin layer, an adhesive layer, and a synthetic resin layer.

The synthetic resin layer may be a polyimide-based resin layer, but the material thereof is not particularly limited. The synthetic resin layer may include at least one of an acryl-based resin, a methacryl-based resin, polyisoprene, a vinyl-based resin, an epoxy-based resin, a urethane-based resin, a cellulose-based resin, a siloxane-based resin, a polyamide-based resin, or a perylene-based resin. In addition, the base layer 111 may include a glass substrate or an organic/inorganic composite material substrate, or the like.

The circuit layer 112 may be disposed on the base layer 111 and may include an insulating layer, a semiconductor pattern, a conductive pattern, a signal line, and the like. The insulating layer, the semiconductor layer, and the conductive layer are formed on the base layer 111 through coating and deposition methods, and subsequently the insulating layer, the semiconductor layer, and the conductive layer may be selectively patterned, for example, through photolithography processes performed multiple times. Subsequently, the semiconductor pattern, the conductive pattern, and the signal line included the circuit layer 112 may be formed.

The light emitting element layer 113 may be disposed on the circuit layer 112 and may include a light emitting element. For example, the light emitting element layer 113 may include an organic light emitting material, a quantum dot, a quantum rod, or micro LED.

The encapsulation layer 114 may be disposed on the light emitting element layer 113 and may include an inorganic layer, an organic layer, and an inorganic layer which are stacked in this order, but layers constituting the encapsulation layer 114 are not limited thereto.

The inorganic layers may protect the light emitting element layer 113 from moisture/oxygen, and the organic layer may protect the light emitting element layer 113 from impurities such as dust particles. The inorganic layers may include a silicon nitride layer, a silicon oxynitride layer, a silicon oxide layer, a titanium oxide layer, an aluminum oxide layer, or the like. The organic layer may include an acrylic-based organic layer, but the embodiment of the inventive concept is not limited thereto.

The sensor layer 120 may be disposed on the display layer 110 and may sense an external input applied from a source, e.g., an external source. The external input may include various types of inputs provided from a source external to the electronic device 1000. For example, the external input may include a touch from a part of the user's body such as a hand and include an external input (for example, hovering) applied when approaching the electronic device 1000 or brought close thereto within a predetermined distance. Also, the external input may have various types such as force, pressure, and light, but is not limited to one embodiment.

The sensor layer 120 may be formed on the display layer 110 through a continuous process. In this case, the sensor layer 120 may be disposed directly on the display layer 110. In one embodiment, being disposed directly on may mean that an intervening third component is not disposed between the sensor layer 120 and the display layer 110. For example, a separate adhesive member may not be between the sensor layer 120 and the display layer 110. Also, the sensor layer 120 may be coupled to the display layer 110 through an adhesive member, which, for example, may include a general adhesive or bonding agent.

Referring to FIG. 3B, a display panel 100-1 may further include an anti-reflection layer 130, compared to the display panel 100 illustrated in FIG. 3A. In this case, an anti-reflection member 200 (e.g., see FIG. 4A) and a third adhesive layer AD3 (e.g., see FIG. 4A) will be omitted in the electronic device 1000 (see FIG. 2) that includes the display panel 100-1. Hereinafter, duplicated descriptions will be omitted.

The display panel 100-1 may include a display layer 110, a sensor layer 120, and an anti-reflection layer 130. According to an embodiment of the inventive concept, the anti-reflection layer 130 may include one or more color filters. The color filters may have a predetermined arrangement, for example, taking into consideration light emission colors of pixels in the display layer 110. Also, the anti-reflection layer 130 may further include a black matrix adjacent to the color filters.

According to an embodiment of the inventive concept, the anti-reflection layer 130 may include a destructive interference structure. For example, the destructive interference structure may include a first refection layer and a second refection layer disposed on different layers. First refection light and second refection light, which are reflected from the first refection layer and the second refection layer, respectively, may destructively interfere and thus reflectivity of external light may be reduced.

Figure 4A:
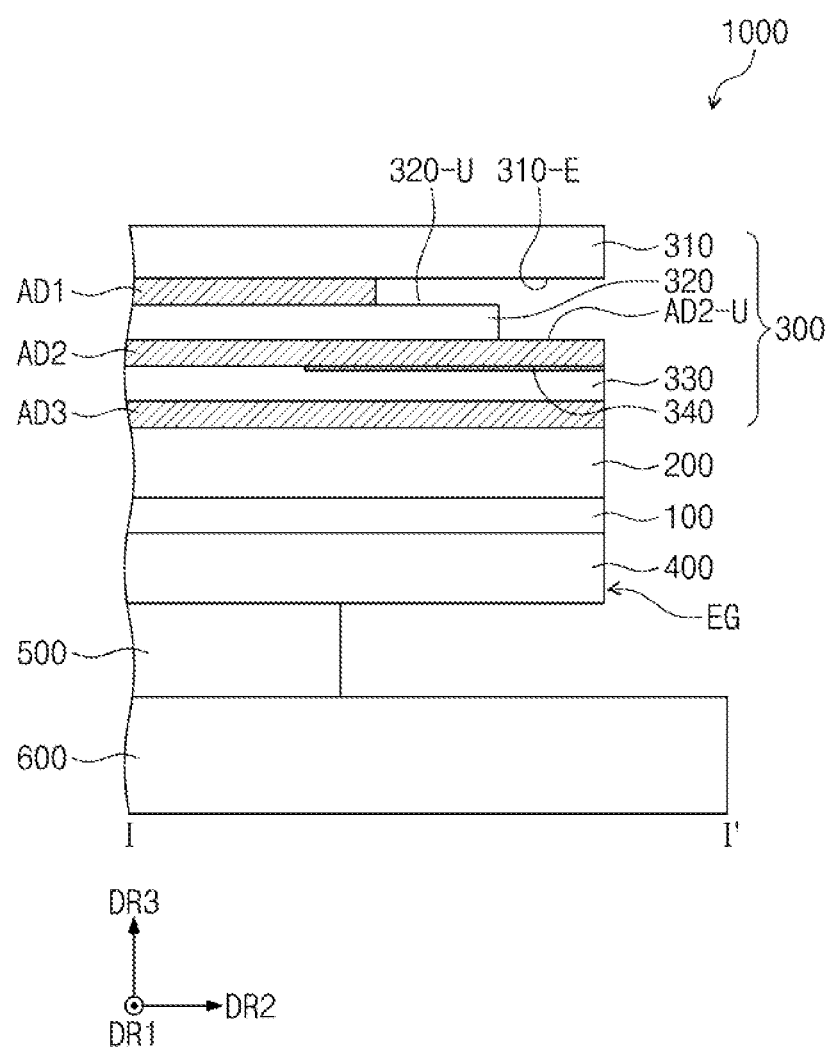
FIG. 4A illustrates a cross-sectional view taken along line I-I' of FIG. 1A.
Figure 4B:
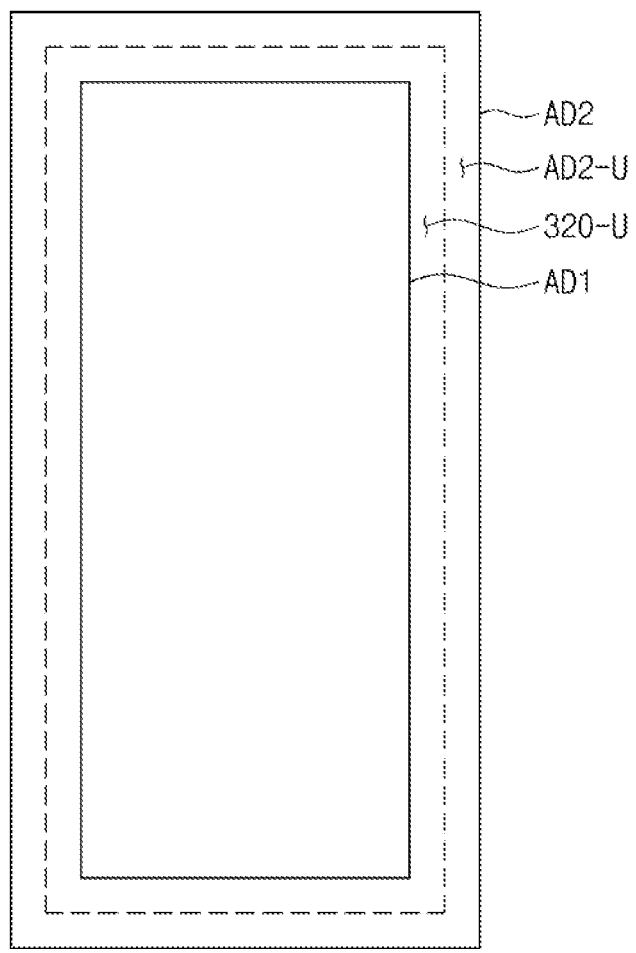
FIG. 4B illustrates a window which, according to an embodiment of the inventive concept, is disposed between adhesive layers of the electronic device and spaced apart from each other.
Figure 4B:
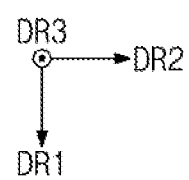
Figure 5:
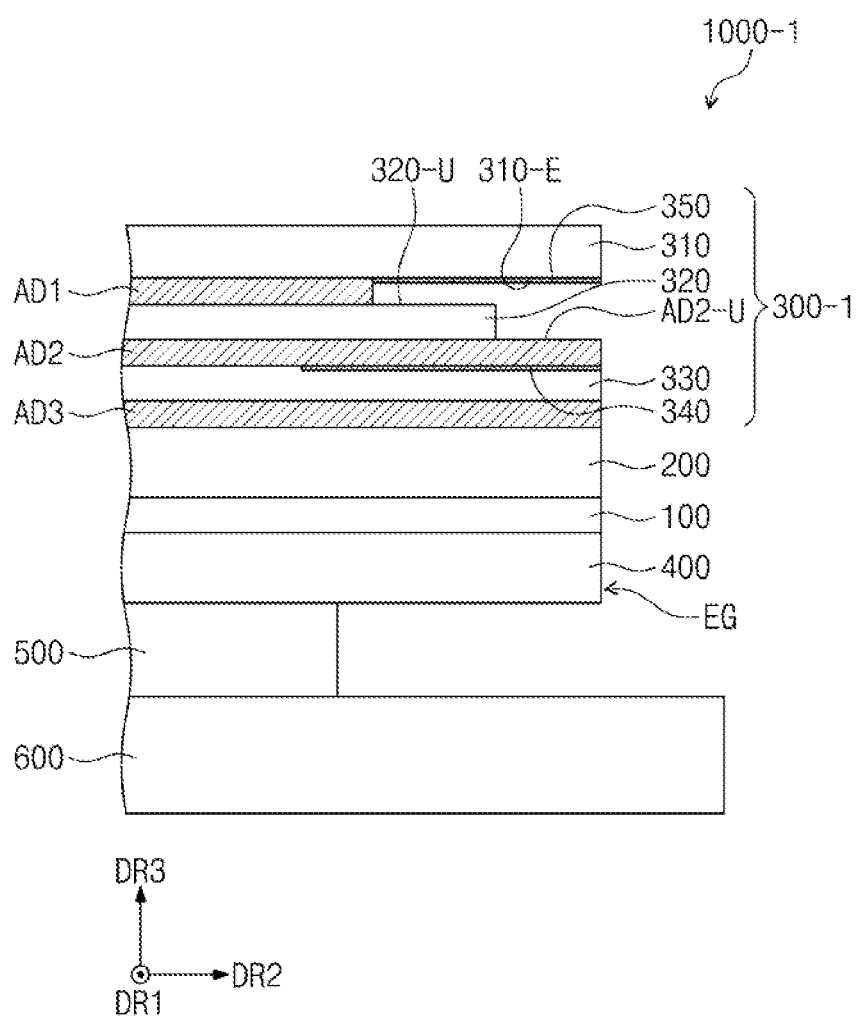
FIG. 5 illustrates a cross-sectional view of an embodiment of an electronic device.
Figure 6A:
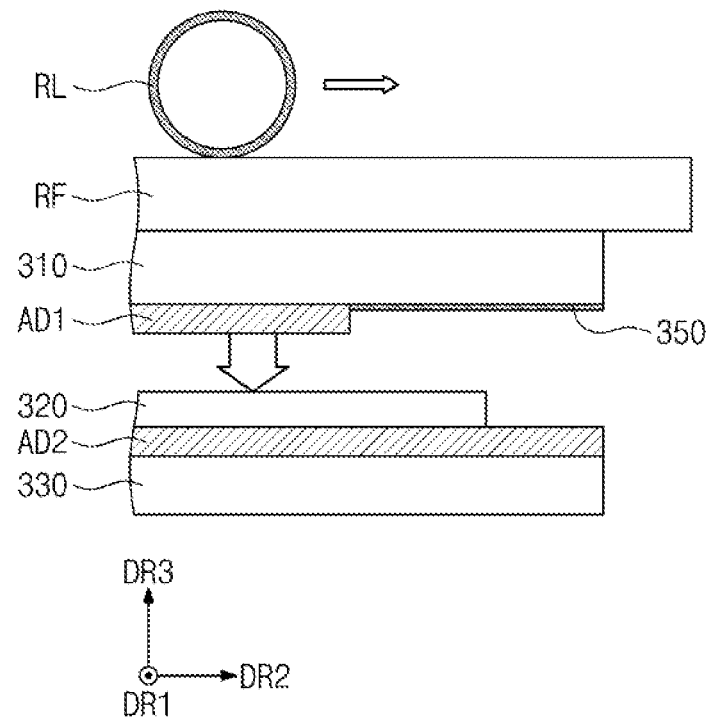
FIG. 6A illustrates a cross-sectional view of a process for pressing a display module according to an embodiment of the inventive concept.
Figure 6B:
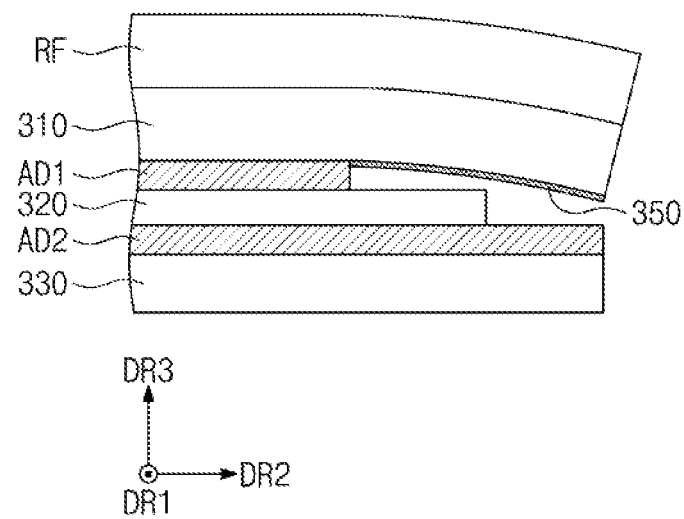
FIG. 6B illustrates a cross-sectional view of a state in which a display module is pressed according to an embodiment of the inventive concept.

FIG. 4A is a cross-sectional view taken along line I-I' of FIG. 1A. FIG. 4B is a plan view schematically illustrating an arrangement relationship where a window according to an embodiment of the inventive concept is disposed between adhesive layers spaced apart from each other. FIG. 5 is a cross-sectional view of an electronic device according to an embodiment of the inventive concept. FIG. 6A is a cross-sectional view illustrating a process for pressing a display module according to an embodiment of the inventive concept. FIG. 6B is a cross-sectional view illustrating a state in which a display module is pressed according to an embodiment of the inventive concept.

Referring to FIG. 4A, according to an embodiment of the inventive concept, an electronic device 1000 may include a display panel 100, an anti-reflection member 200, an upper member 300, a protective film 400, a cushion member 500, and a metal plate 600. As described above, the display panel 100 may generate an image and sense an external input.

The anti-reflection member 200 may be disposed on the display panel 100 and may reduce reflectivity of external light incident from the outside. The anti-reflection member 200 may include an elongated synthetic resin film. For example, the anti-reflection member 200 may be provided by dying a polyvinyl alcohol (PVA) film with an iodine compound. However, this is merely an example, and the materials constituting the anti-reflection member 200 is not limited to the example described above.

The upper member 300 may be disposed on the anti-reflection member 200. In the embodiment, the upper member 300 may include a protective layer 310, a window 320, and an impact absorbing layer 330. The protective layer 310 may be disposed on the window 320 and may protect components disposed below the protective layer 310. A hard coating layer, an anti-fingerprint layer, or the like may be provided in the protective layer 310 to enhance characteristics of chemical resistance, wear resistance, or the like. The protective layer 310 may include a film having elastic modulus of, for example, about 15 GPa or less at room temperature.

The window 320 may be below the protective layer 310 and may include an optically transparent insulating material. For example, the window 320 may include a glass substrate or a synthetic resin film. In a case in which the window 320 is a glass substrate, the thickness of the window 320 is about 80 micrometers or less, but the thickness of the window 320 is not limited thereto. In a case in which the window 320 is a synthetic resin film, the window 320 may include, for example, a polyimide (Pl) film or a polyethylene terephthalate (PET) film.

The window 320 may have a multi-layer structure or a single-layer structure. For example, window 320 may include a plurality of synthetic resin films coupled by an adhesive, or a glass substrate and a synthetic resin film coupled to each other by an adhesive.

The impact absorbing layer 330 may be below the window 320 and may be a functional layer for protecting the display panel 100 from external impact. The impact absorbing layer 330 may be selected among films having elastic modulus of, for example, about 1 GPa or greater at room temperature. The impact absorbing layer 330 may be an oriented film having an optical function. For example, the impact absorbing layer 330 may be an optical axis control film. In one embodiment, the impact absorbing layer 330 may be a biaxially oriented PET film.

A light blocking layer 340 may be disposed on the impact absorbing layer 330. The light blocking layer 340 may be provided, for example, by being printed on the top surface of the impact absorbing layer 330. The light blocking layer 340 may overlap a peripheral area 1000NA and, for example, may be a colored layer formed, for example, using a coating method.

The light blocking layer 340 may include, for example, polymer resin and a pigment mixed in the polymer resin. The polymer resin may be acrylic-based resin or polyester, and the pigment may be a carbon-based pigment. However, the material constituting the light blocking layer 340 is not limited thereto.

The lower functional layers may be disposed below the display panel 100 and may include, for example, one or more of a protective film 400, a cushion member 500, and a metal plate 600. Also, a height difference-compensating member for maintaining a radius of curvature of the folding area 1000A2 when folded may be provided in the lower functional layers. The components in the functional layers are not limited thereto. At least a portion of the components mentioned above may be omitted or other components may be added.

The protective film 400 is disposed below the display panel 100 and may serve to prevent scratches from occurring on the rear surface of the display panel 100 during a process for manufacturing the display panel 100. The protective film 400 may be a colored polyimide film. For example, the protective film 400 may be an opaque yellow film, but the embodiment of the inventive concept is not limited thereto.

The cushion member 500 may be disposed below the protective film 400 and may protect the display panel 100 from an impact applied from a lower side. The impact resistance characteristics of the display device 1000 may be enhanced by cushion member 500.

The cushion member 500 may include a barrier film and a cushion layer and may be provided to enhance impact resistance performance. The barrier layer may have a role in preventing the display panel 100 from being deformed. The barrier film may be a synthetic resin film, for example, a polyimide film, but the embodiment of the inventive concept is not limited thereto.

The cushion layer may include, for example, foam or sponge. The foam may include polyurethane foam or thermoplastic polyurethane foam. In a case in which the cushion layer includes the foam, the cushion layer may be formed with the barrier film as a base layer. For example, a foaming agent is foamed on the barrier film to form the cushion layer. At least one of the barrier film or the cushion layer may have color that absorbs light. For example, at least one of the barrier film or the cushion layer is black. In this case, components disposed below the cushion member 500 may be prevented from being viewed from the outside.

The metal plate 600 may be disposed below the cushion member 500 and may include a plate 610, a lower adhesive layer 620, and a cover layer 630. The metal plate 600 may include a material having elastic modulus of about 60 GPa or greater at room temperature. For example, the metal plate 600 may include SUS304, but the embodiment of the inventive concept is not limited thereto. The metal plate 600 may support components disposed above the metal plate 600. Also, heat dissipation performance of the electronic device 1000 may be enhanced by the metal plate 600.

A opening portion may be defined in a region of the metal plate 600 overlapping the second area 1000A2. By the opening portion of the metal plate 600 overlapping the folding area, the shape of a portion of the metal plate 600 overlapping the second area 1000A2 may be more easily deformed. A heat dissipation sheet having high thermal conductivity may be further provided below the metal plate 600, and the heat dissipation sheet may be a graphitized polymer film. The polymer film may be, for example, a polyimide film.

According to an embodiment of the inventive concept, the electronic device 1000 may include a plurality of adhesive layers. The adhesive layers may include one of a pressure sensitive adhesive film (PSA), an optically clear adhesive film (OCA), or an optically clear resin (OCR). Although first to third adhesive layers AD1, AD2, and AD3 are illustrated in FIG. 4A, the embodiment of the inventive concept is not limited thereto. Adhesive layers may also be disposed between the display panel 100 and the anti-reflection member 200, between the display panel 100 and the protective film 400, and between the cushion member 500 and the metal plate 600.

The first adhesive layer AD1 may be disposed between the protective layer 310 and the window 320 to couple the protective layer 310 to the window 320. An edge 320-U of the front surface of the window 320 may be exposed from the first adhesive layer AD1. Also, an edge 310-E of the rear surface of the protective layer 310 may be exposed from the first adhesive layer AD1. In the embodiment of the inventive concept, the edge may be defined as a peripheral portion of each component in a plan view.

The second adhesive layer AD2 may be disposed between the window 320 and the impact absorbing layer 330 to couple the window 320 to the impact absorbing layer 330. An edge AD2-U of the second adhesive layer AD2 may be exposed from the window 320.

FIG. 4B schematically illustrates a plan view of a relationship between the first adhesive layer AD1 and the second adhesive layer AD2 illustrated in FIG. 4A. The window 320 is shown by a dotted line. According to an embodiment of the inventive concept, the surface area of the first adhesive layer AD1 in the first direction DR1 and the second direction DR2 may be less than the surface area of the second adhesive layer AD2. Thus, the edge 320-U of the front surface of the window 320 may be exposed from the first adhesive layer AD1, and the edge AD2-U of the second adhesive layer AD2 may be exposed from the window 320, which may have a surface area greater than the first adhesive layer AD1 and less than the second adhesive layer AD2. Also, the edge AD2-U of the second adhesive layer AD2 exposed from the window 320 may surround the first adhesive layer AD1.

According to an embodiment of the inventive concept, the adhesive layers AD1 and AD2 are disposed in different layers with the window 320 therebetween and have surface areas which are different from each other. Thus, there is no interference between the adhesive layers AD1 and AD2 due to an external force or during folding.

According to an embodiment of the inventive concept, a side surface of the second adhesive layer AD2, a side surface of the impact absorbing layer 330, a side surface of the anti-reflection member 200, a side surface of the display panel 100, and a side surface of the protective film 400, which are adjacent to the edge AD2-U of the second adhesive layer AD2, may be aligned with each other. The aligned side surfaces may correspond to a module side portion EG, which may be a side surface formed, for example, by simultaneously cutting the second adhesive layer AD2, the impact absorbing layer 330, the anti-reflection member 200, the display panel 100, and the protective film 400 in the same process.

Referring to FIG. 5, according to an embodiment of the inventive concept, an electronic device 1000-1 may include a display panel 100, an anti-reflection member 200, an upper member 300-1, a protective film 400, a cushion member 500, and a metal plate 600. Also, a plurality of adhesive layers AD1, AD2, and AD3 may be provided. Except for the upper member 300-1, components of the electronic device 1000-1 illustrated in FIG. 5 may be the same as those of the electronic device 1000 illustrated in FIG. 4A.

According to the embodiment, the upper member 300-1 may include a protective layer 310, a window 320, an impact absorbing layer 330, a light blocking layer 340, and an anti-fingerprint layer 350. The protective layer 310 may be disposed on the window 320, and the window 320 and the protective layer 310 may be coupled to each other by the first adhesive layer AD1. The impact absorbing layer 330 may be disposed below the window 320, and the window 320 and the impact absorbing layer 330 may be coupled to each other by the second adhesive layer AD2.

The light blocking layer 340 may be disposed on the impact absorbing layer 330 and may be provided, for example, by being printed on the top surface of the impact absorbing layer 330. The light blocking layer 340 may overlap the peripheral area 1000NA and may be a colored layer formed, for example, using a coating method.

The anti-fingerprint layer 350 may be disposed on an edge 310-E of a rear surface of the protective layer 310 exposed from the first adhesive layer AD1. The anti-fingerprint layer 350 may prevent the second adhesive layer AD2 from being directly coupled to the protective layer 310 due to external impact or external force applied when folded. Accordingly, the upper member 300-1 may be provided to have improved reliability.

The anti-fingerprint layer 350 may include a material having anti-fingerprint properties. For example, the anti-fingerprint layer 350 may include at least one of a metal oxide such as a titanium oxide, a silicon-based compound, or a fluorine-based compound. The anti-fingerprint layer 350 may be formed on an edge 310-E of the rear surface of the protective layer 310 through a wet coating or dry coating process.

FIGS. 6A and 6B illustrate an example process for bonding the protective layer 310, the window 320, and the impact absorbing layer 330 through a lamination process. Referring to FIGS. 6A and 6B, the lamination process is performed by attaching a releasing film RF onto the protective layer 310 and pressing the releasing film RF in a second direction DR2 using a roller RL. The releasing film RF may be removed after the lamination process.

When pressed by the roller RL, an edge of the protective layer 310 and an edge of the second adhesive layer AD2 may be close to or brought into contact with each other due to a stepped portion formed by a difference in surface areas between the first adhesive layer AD1 and the protective layer 310 and between the first adhesive layer AD1 and the second adhesive layer AD2.

According to an embodiment of the inventive concept, the surface area of the first adhesive layer AD1 is less than the surface area of the second adhesive layer AD2 (e.g., see FIG. 4B). Thus, the first adhesive layer AD1 and the second adhesive layer AD2, disposed with the window 320 therebetween, may be prevented from being coupled to each other even when pressed by the roller RL.

Also, in one embodiment an anti-fingerprint layer 350 may be disposed on the rear surface of the protective layer 310. Thus, although an edge of the protective layer 310 is brought close to the second adhesive layer AD2 when pressed, direct contact therebetween is prevented by the anti-fingerprint layer 350. Therefore, the second adhesive layer AD2 and the protective layer 310 are prevented from being coupled to each other. Also, an adhesive force at an edge of the second adhesive layer AD2 may be reduced during a process for applying the anti-fingerprint layer 350 to the protective layer 310.

Figure 7:
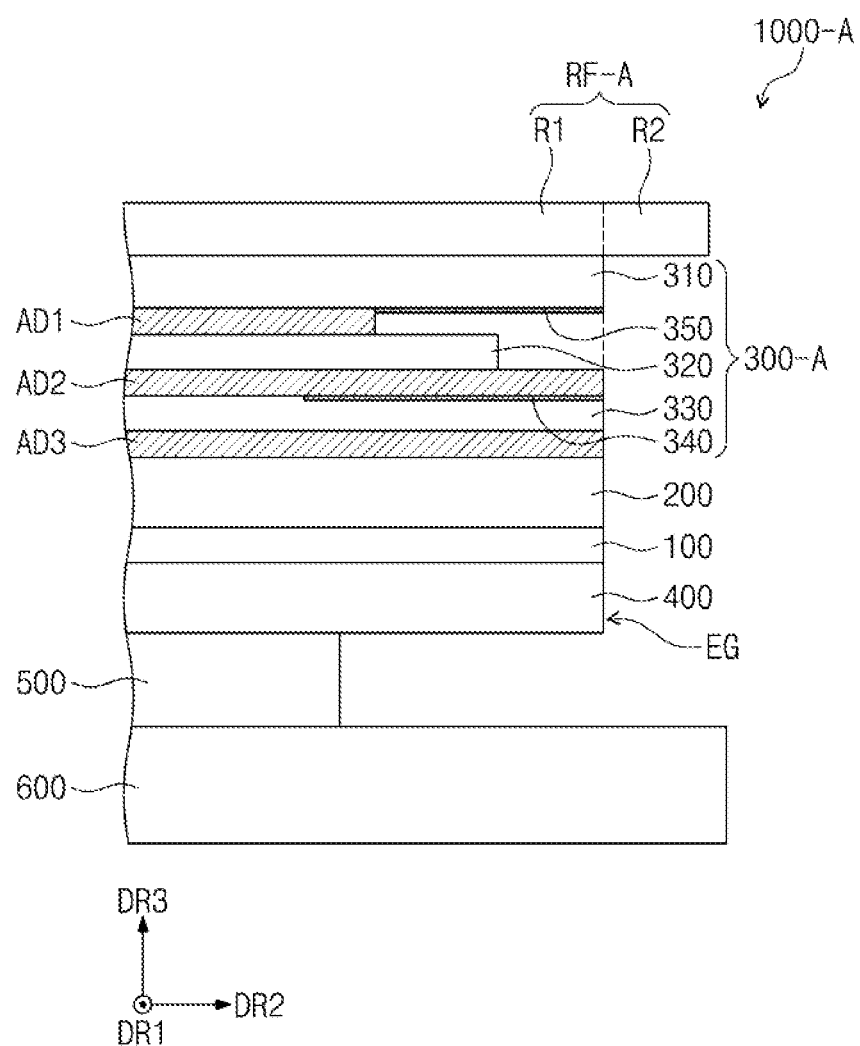
FIG. 7 illustrates a cross-sectional view of a display module according to an embodiment of the inventive concept.
Figure 8:
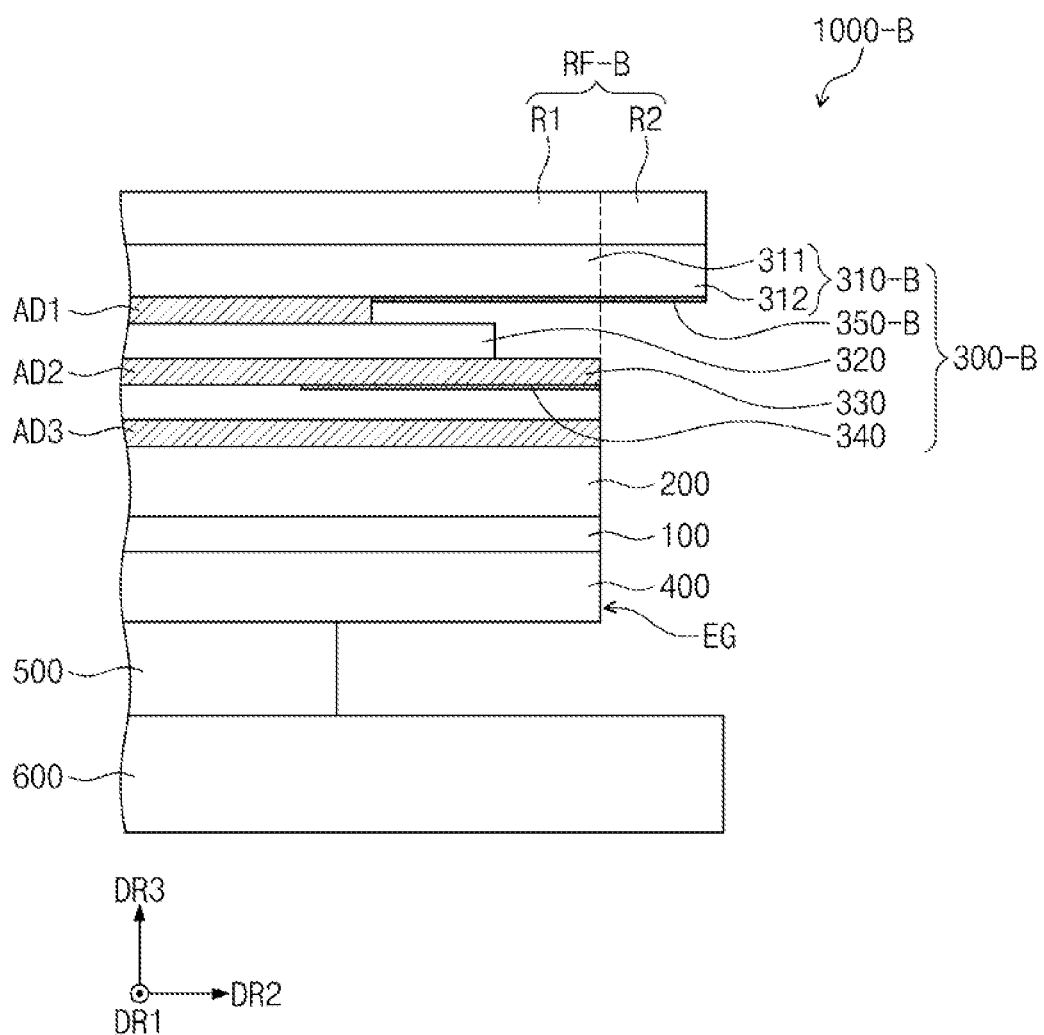
FIG. 8 illustrates a cross-sectional view of a display module according to an embodiment of the inventive concept.
Figure 9:
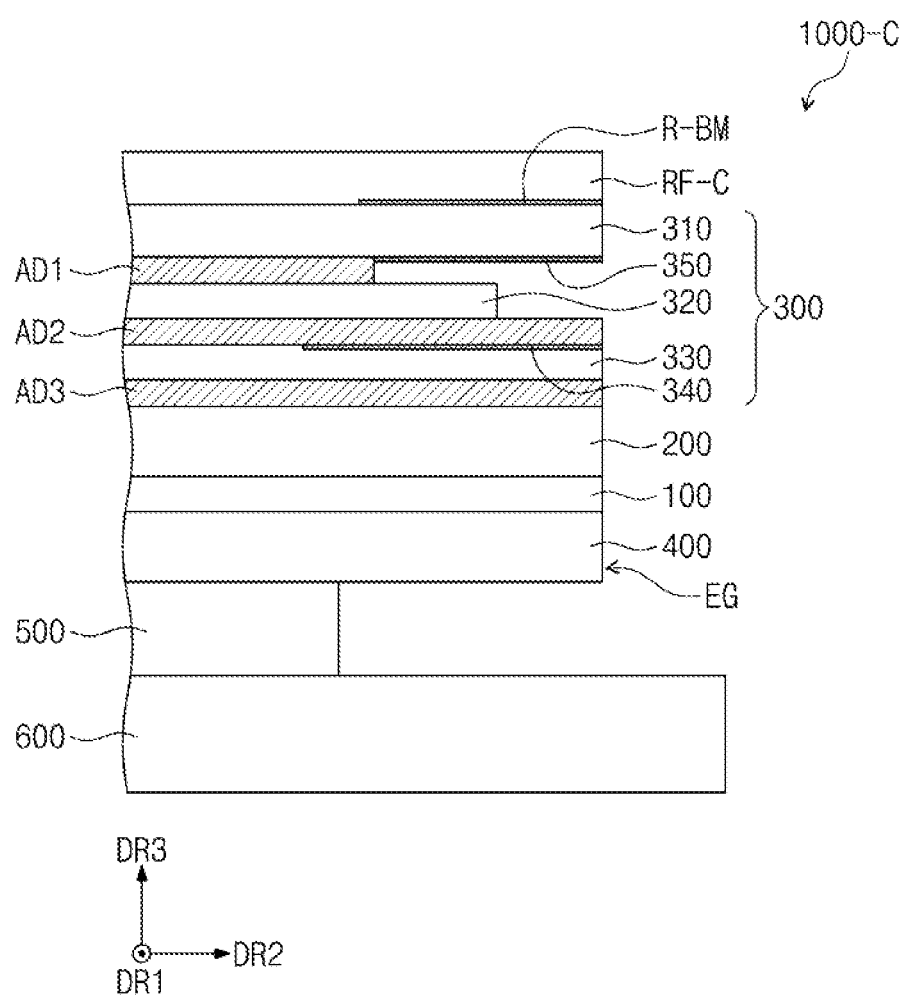
FIG. 9 illustrates a cross-sectional view of a display module according to an embodiment of the inventive concept.
Figure 10:
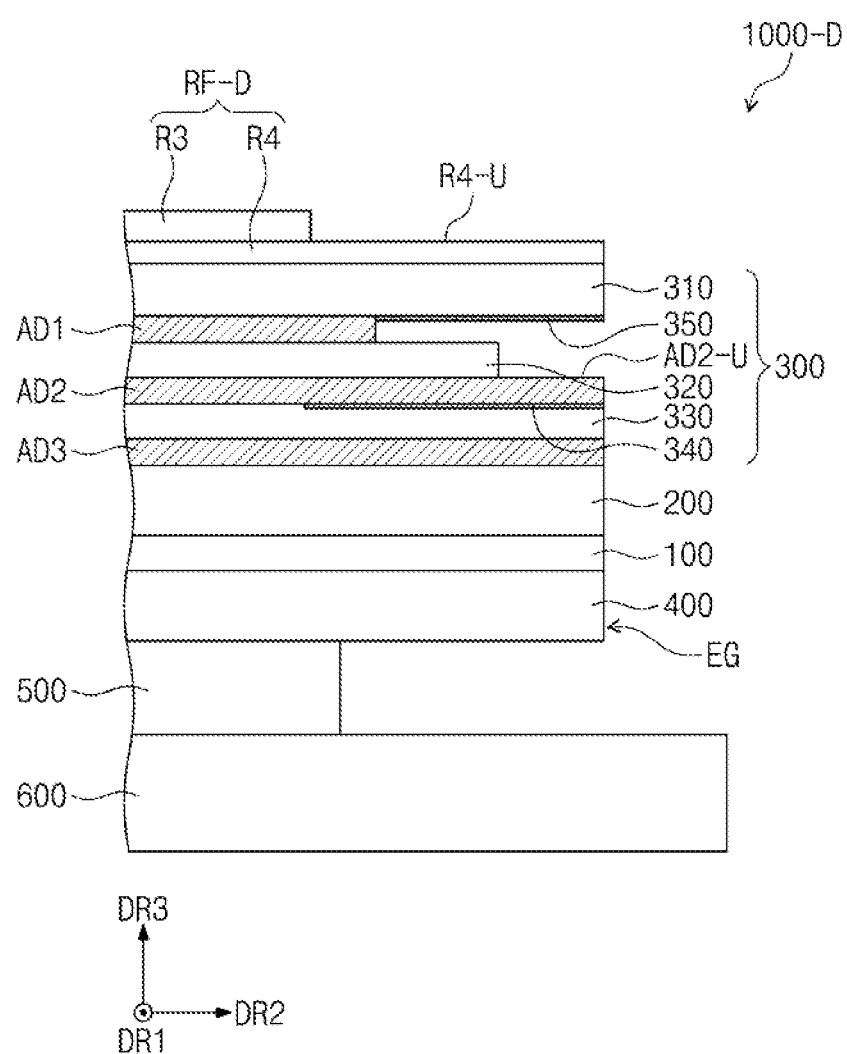
FIG. 10 illustrates a cross-sectional view of a display module according to an embodiment of the inventive concept.

FIG. 7 is a cross-sectional view of a display module according to an embodiment of the inventive concept. FIG. 8 is a cross-sectional view of a display module according to an embodiment of the inventive concept. FIG. 9 is a cross-sectional view of a display module according to an embodiment of the inventive concept. FIG. 10 is a cross-sectional view of a display module according to an embodiment of the inventive concept. Same or similar components as in FIGS. 1 to 6B are given the same or similar reference symbols.

FIGS. 7 to 10 show embodiments including releasing films attached during the lamination process illustrated in FIGS. 6A and 6B. Hereinafter, a state in which a releasing film is disposed on the protective layer may be defined as a display module in an embodiment of the inventive concept.

Referring to FIG. 7, in an embodiment, the display module 1000-A may include a display panel 100, an anti-reflection member 200, an upper member 300-A, a protective film 400, a cushion member 500, and a metal plate 600. Also, the display module 1000-A may include an releasing film RF-A disposed on the upper member 300-A.

The upper member 300-A, according to an embodiment, may include a protective layer 310, a window 320, an impact absorbing layer 330, a light blocking layer 340, and an anti-fingerprint layer 350. The protective layer 310 may be disposed on the window 320, and the window 320 and the protective layer 310 may be coupled to each other by a first adhesive layer AD1. The impact absorbing layer 330 may be disposed below the window 320, and the window 320 and the impact absorbing layer 330 may be coupled to each other by a second adhesive layer AD2.

The light blocking layer 340 may be disposed on the impact absorbing layer 330 and may be provided by being printed on the top surface of the impact absorbing layer 340. The light blocking layer 340 may overlap the peripheral area 1000NA and may be a colored layer formed, for example, using a coating method.

The anti-fingerprint layer 350 may be disposed on an edge 310-E of a rear surface of the protective layer 310 exposed from the first adhesive layer AD1. The anti-fingerprint layer 350 may prevent the second adhesive layer AD2 from being coupled to the protective layer 310 due to an external impact or an external force applied when folded. Accordingly, the upper member 300-A may be provided to have improved reliability.

In the embodiment, the releasing film RF-A may include a first film R1 and a second film R2. The first film R1 may overlap the second adhesive layer AD2, and in a cross-section the second film R2 may protrude from the first film R1 in a second direction DR2. In the embodiment, a side surface of the second film R2 may further protrude than a module side portion EG in the second direction DR2. Thus, the releasing film RF-A may cover the entire surface of the protective layer 310.

Referring to FIG. 8, in an embodiment, the display module 1000-B may include a display panel 100, an anti-reflection member 200, an upper member 300-B, a protective film 400, a cushion member 500, and a metal plate 600. Also, the display module 1000-B may include an releasing film RF-B disposed on the upper member 300-B.

According to the embodiment, the upper member 300-B may include a protective layer 310-B, a window 320, an impact absorbing layer 330, a light blocking layer 340, and an anti-fingerprint layer 350-B. The protective layer 310-B may include a first section 311 and a second section 312. The first section 311 may overlap the second adhesive layer AD2, and in a cross-section the second section 312 may protrude from the first section 311 in a second section DR2. In the embodiment, a side surface of the second section 312 may further protrude than a module side portion EG in the second direction DR2.

In the embodiment, the releasing film RF-B may include a first film R1 and a second film R2. The first film R1 may overlap the first section 311, and the second film R2 may overlap the second section 312. In the embodiment, a side surface of the second film R2 may further protrude than a module side portion EG in the second direction DR2.

The anti-fingerprint layer 350-B may be disposed on the entire surface of the second section 312 and a portion of the first section 311 adjacent to the second section 312.

According to the embodiment, the protective layer 310-B includes the second section 312 that further protrudes than the module side portion EG in one direction. Thus, when the releasing film RF-B is removed, an external force applied to the protective layer 310-B may be distributed to the second section 312 spaced apart from the second adhesive layer AD2.

Referring to FIG. 9, in an embodiment, the display module 1000-C may include a display panel 100, an anti-reflection member 200, an upper member 300, a protective film 400, a cushion member 500, and a metal plate 600. Also, the display module 1000-C may include a releasing film RF-C and an additional anti-fingerprint layer R-BM which are disposed above the upper member 300.

The upper member 300, according to an embodiment, may include a protective layer 310, a window 320, an impact absorbing layer 330, a light blocking layer 340, and an anti-fingerprint layer 350. The protective layer 310 may be disposed on the window 320, and the window 320 and the protective layer 310 may be coupled to each other by a first adhesive layer AD1. The impact absorbing layer 330 may be disposed below the window 320, and the window 320 and the impact absorbing layer 330 may be coupled to each other by a second adhesive layer AD2.

The light blocking layer 340 may be disposed on the impact absorbing layer 330 and may be provided, for example, by being printed on the top surface of the impact absorbing layer 330. The light blocking layer 340 may overlap the peripheral area 1000NA and may be a colored layer, for example, formed using a coating method.

The anti-fingerprint layer 350 may be disposed on an edge 310-E of a rear surface of the protective layer 310 exposed from the first adhesive layer AD1. The anti-fingerprint layer 350 may prevent the second adhesive layer AD2 from being coupled to the protective layer 310 due to an external impact or an external force applied when folded. Accordingly, the upper member 300 having the improved reliability may be provided. The anti-fingerprint layer 350 may include a material having anti-fingerprint properties.

The additional anti-fingerprint layer R-BM may be disposed between the protective layer 310 and the releasing film RF-C. For example, the additional anti-fingerprint layer R-BM may overlap an edge of the second adhesive layer AD2 and may be applied to a surface of the releasing film RF-C. The additional anti-fingerprint layer R-BM may include a material having anti-fingerprint properties.

According to the embodiment, the additional anti-fingerprint layer R-BM may overlap the edge of the second adhesive layer AD2 exposed from the window 320. Thus, a coupling force may be reduced between the releasing film RF-C and the protective layer 310 in a region in which the additional anti-fingerprint layer R-BM is disposed. Accordingly. when the releasing film RF-C is removed from the protective layer 310, an external force applied to the protective layer 310 may be reduced.

Referring to FIG. 10, in an embodiment, a display module 1000-D may include a display panel 100, an anti-reflection member 200, an upper member 300, a protective film 400, a cushion member 500, and a metal plate 600. Also, the display module 1000-D may include a releasing film RF-D disposed on the upper member 300.

In the embodiment, the releasing film RF-D may include a third section R3 and a fourth section R4 which are stacked in a third direction DR3. The fourth section R4 is disposed on the protective layer 310 to cover the entire surface of the protective layer 310. The third section R3 is disposed on the fourth section R4 to expose an edge R4-U of the fourth section R4. In a plan view, the third section R3 may have a surface area smaller than that of a first adhesive layer AD1.

The thickness of a portion of the releasing film RF-D, in which only the fourth portion R4 is disposed, is less than the thickness of a portion of the releasing film RF-D in which both the third section R3 and the fourth section R4 are disposed. Thus, a coupling force of the releasing film RF-D may be reduced in a region having a small thickness. According to the embodiment, a coupling force between the releasing film RF-D and the protective layer 310 in the edge R4-U of the fourth section R4 may be smaller than that of other regions. Thus, when the releasing film RF-D is removed, the external force applied to the protective layer 310 may be reduced.

In accordance with another embodiment, an apparatus of a display device includes a first layer having a first surface area, a second layer having a second surface area, and a third layer between the first layer and the second layer and having a third surface area. The first layer may be an adhesive layer between a protective layer and window, the second layer may be an adhesive layer between the window and an impact absorbing layer, and the third layer include the window as described in connection with other embodiments described herein. The first surface area may be less than the second surface area, and the third surface area and the second surface area may be greater than the third surface area.

According to the embodiment of the inventive concept, because the adhesive layers spaced from each other, with the window therebetween, have different surface areas, the adhesive layers may be prevented from being coupled to each other due to the application of an external force or during folding. Accordingly, an electronic device may be provided having improved reliability.

Although described with reference to exemplary embodiments of the present disclosure, it will be understood that various changes and modifications of the present disclosure may be made by one ordinary skilled in the art or one having ordinary knowledge in the art without departing from the spirit and technical field of the present disclosure as hereinafter claimed. Hence, the technical scope of the present disclosure is not limited to the detailed descriptions in the specification but should be determined only with reference to the claims. The embodiments may be combined to form additional embodiments.

What is claimed is:

1. An electronic device, comprising:
   an upper member which comprises a window having a front surface and a rear surface opposite to the front surface, a protective layer disposed on the front surface of the window, and an impact absorbing layer disposed on the rear surface of the window;
   a display panel disposed below the upper member;
   a first adhesive layer disposed between the window and the protective layer; and
   a second adhesive layer disposed between the window and the impact absorbing layer, wherein an edge of the front surface of the window is exposed by the first adhesive layer and wherein an edge of the second adhesive layer is exposed by the window.

2. The electronic device of claim 1, wherein the edge of the second adhesive layer exposed from the window surrounds the first adhesive layer.

3. The electronic device of claim 1, wherein an edge of a rear surface of the protective layer is exposed by the first adhesive layer.

4. The electronic device of claim 1, further comprising a light blocking layer which is disposed between the second adhesive layer and the impact absorbing layer and disposed along an edge of the impact absorbing layer.

5. The electronic device of claim 1, further comprising an anti-fingerprint layer disposed on a rear surface of the protective layer that is exposed from the first adhesive layer.

6. The electronic device of claim 1, further comprising an anti-reflection member disposed between the upper member and the display panel.

7. The electronic device of claim 6, further comprising a protective film disposed below the display panel.

8. The electronic device of claim 7, wherein a side surface of the second adhesive layer, a side surface of the impact absorbing layer, a side surface of the anti-reflection member, a side surface of the display panel, and a side surface of the protective film, which are adjacent to the edge of the second adhesive layer exposed from the window, are aligned with each other.

9. The electronic device of claim 7, further comprising a cushion member disposed below the protective film.

10. The electronic device of claim 9, further comprising a metal plate disposed below the cushion member.

11. A display module, comprising:
an upper member which comprises a window having a front surface and a rear surface opposite to the front surface, a protective layer disposed on the front surface of the window, and an impact absorbing layer disposed on the rear surface of the window;
a releasing film configured to cover the upper member;
a display panel disposed below the upper member;
a first adhesive layer disposed between the window and the protective layer; and
a second adhesive layer disposed between the window and the impact absorbing layer, wherein an edge of the front surface of the window is exposed by the first adhesive layer and wherein an edge of the second adhesive layer is exposed by the window.

12. The display module of claim 11, wherein the edge of the second adhesive layer exposed from the window surrounds the first adhesive layer.

13. The display module of claim 11, wherein an edge of a rear surface of the protective layer is exposed by the first adhesive layer.

14. The display module of claim 11, further comprising a light blocking layer which is disposed between the second adhesive layer and the impact absorbing layer and along an edge of the impact absorbing layer.

15. The display module of claim 11, further comprising an anti-fingerprint layer disposed on a rear surface of the protective layer that is exposed from the first adhesive layer.

16. The display module of claim 11, further comprising:
an anti-reflection member between the upper member and the display panel; and
a protective film disposed below the display panel.

17. The display module of claim 16, wherein a side surface of the second adhesive layer, a side surface of the impact absorbing layer, a side surface of the anti-reflection member, a side surface of the display panel, and a side surface of the protective film, which are adjacent to the edge of the second adhesive layer exposed from the window, are aligned with each other.

18. The display module of claim 17, wherein the releasing film comprises:
a first film overlapping the second adhesive layer; and
a second film protruding from the first film in one direction.

19. The display module of claim 18, wherein the protective layer comprises:
a first section overlapping the first film; and
a second section overlapping the second film.

20. The display module of claim 19, further comprising an additional anti-fingerprint layer disposed between the releasing film and the protective layer.

* * * * *